(No Model.)

E. J. JARVIS.
VERMIN TRAP.

No. 314,133. Patented Mar. 17, 1885.

Witnesses.
John G. Ridout
Charles C. Baldwin

Inventor.
Edgar J. Jarvis
by
Donald C. Ridout & Co.
Attys —

UNITED STATES PATENT OFFICE.

EDGAR J. JARVIS, OF TORONTO, ONTARIO, CANADA.

VERMIN-TRAP.

SPECIFICATION forming part of Letters Patent No. 314,133, dated March 17, 1885.

Application filed August 25, 1884. (No model.)

*To all whom it may concern:*

Be it known that I, EDGAR J. JARVIS, of the city of Toronto, in the county of York, in the Province of Ontario, Canada, have invented certain new and useful Improvements in Vermin-Traps, of which the following is a specification.

This invention relates to vermin-traps; and it consists in the peculiar combinations and the construction and arrangement of parts hereinafter more fully described and claimed.

Figure 1:
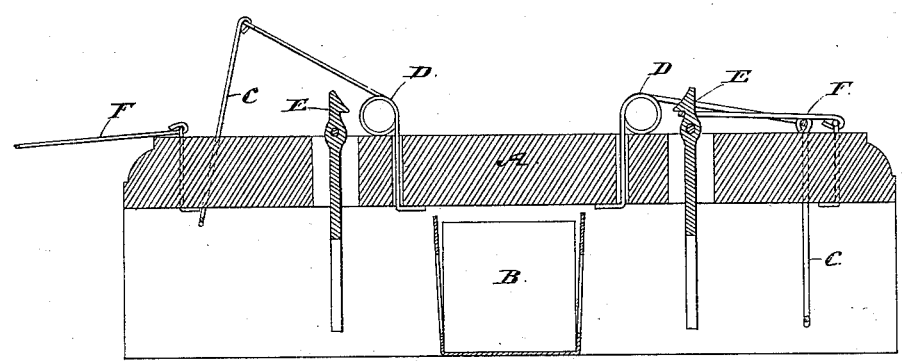
Figure 2:
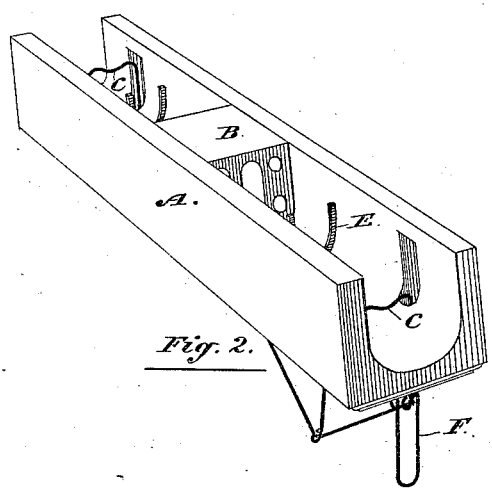
Figure 3:
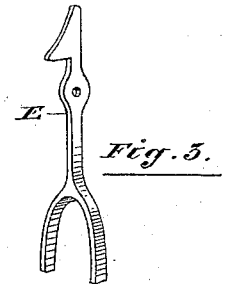
Figure 5:
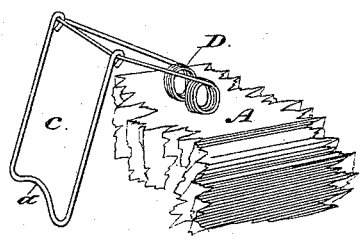
Figure 4:
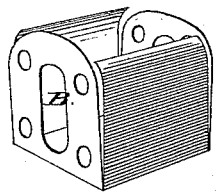

Figure 1 is a sectional side elevation of my improved vermin-trap. Fig. 2 is a perspective bottom view of my improved trap. Fig. 3 is a perspective detail of trip-catch. Fig. 4 is a perspective detail of the bait-box. Fig. 5 is a perspective detail showing the form of the spring-loop.

A represents a rectangular block made in the form of a parallelopiped. This block is hollowed out on one side, which side is intended to form the bottom of the trap, as shown, to form a groove of sufficient size to admit the vermin for which the trap is intended to be set. I prefer to form the grooves in long strips of wood, which may afterward be cut into the desired lengths, although it is evident that the blocks can be cut into proper lengths before the grooves are formed in them.

B is the bait-box, made of tin or any suitable sheet metal or wire bent in the form shown in Fig. 4. The sides forming the box, not being joined together, will naturally spring apart, and as it is made the size of the groove cut in the block A, the springing action of the sides will cause the box to fit sufficiently tight into the groove to retain it in position, as shown in Fig. 2. The ends of the bait-box B are perforated, as represented, so that the vermin entering the groove can both see and smell the bait.

C is a choking-loop attached to the block A by the ordinary spring, D.

E is a trip-catch, formed substantially as shown in Fig. 3, and pivoted to the block A, for the purpose of holding down the locking-bar F, which sets the trap, as shown on the right-hand side of Fig. 1.

It will be noticed that the loop C has its lower end bent inwardly to form an upwardly-curved bow, *a*, which upwardly-curved bow is so shaped for the purpose of more quickly choking the vermin which may be caught by it.

As before stated, Fig. 3 shows the form of the trip-catch E. From this figure it will be seen that the portion of the trip-catch E which extends into the groove made in the block A is bifurcated, so as to leave a clear space in the center of the groove for the passage of the head of the vermin, the bifurcated end of the trip-catch E being so shaped that the shoulders of the vermin passing through it will come in contact with and act against it. Thus the vermin attracted by the bait within the box B will pass through the loop C without meeting any apparent obstruction until its shoulders come against the bifurcated end of the trip-catch E, which catch will thus be moved on its pivot and the upper notched end of the catch E thus pushed clear of the locking-bar F, which, in relieving the loop C, permits the spring D to force it up, and thus strangle the vermin as desired.

What I claim as my invention is—

1. A rectangular block, A, made in the form of a parallelopiped, having a groove cut out of one side of it the entire length of the block, in combination with the sheet-metal or wire spring-sided bait-box B, arranged substantially as and for the purpose specified.

2. A rectangular block, A, made in the form of a parallelopiped, having a groove cut out of one side of it the entire length of the block, and a sheet-metal or wire spring-sided bait-box at or near its longitudinal center, in combination with the choke-loop C, extending into the groove, and spring D, for actuating the loop C and the locking-bar F, and trip-catch E, substantially as and for the purpose specified.

3. In a spring-catch vermin-trap, the combination, with the spring D, of the choke-loop C, actuated by said spring and having its lower end bent to form an upwardly-curved bow, *a*, substantially as and for the purpose specified.

EDGAR J. JARVIS.

Witnesses:
C. C. BALDWIN,
JAS. E. MAYBEE.